(12) United States Patent
Fukusen et al.

(10) Patent No.: US 12,311,552 B2
(45) Date of Patent: May 27, 2025

(54) METHOD OF ADJUSTING ACTION PARAMETER

(71) Applicant: SEIKO EPSON CORPORATION, Tokyo (JP)

(72) Inventors: Takahisa Fukusen, Matsumoto (JP); Kimitake Mizobe, Nagaokakyo (JP); Jun Toda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 289 days.

(21) Appl. No.: 17/938,989

(22) Filed: Sep. 7, 2022

(65) Prior Publication Data
US 2023/0071104 A1 Mar. 9, 2023

(30) Foreign Application Priority Data
Sep. 8, 2021 (JP) .................................. 2021-146004

(51) Int. Cl.
*B25J 9/16* (2006.01)
(52) U.S. Cl.
CPC .................................. *B25J 9/1664* (2013.01)
(58) Field of Classification Search
None
See application file for complete search history.

(56) References Cited

U.S. PATENT DOCUMENTS

| | | | |
|---|---|---|---|
| 2017/0361464 A1* | 12/2017 | Sasaki | B25J 9/1687 |
| 2019/0001508 A1* | 1/2019 | Li | B25J 9/1612 |
| 2019/0275678 A1* | 9/2019 | Takeuchi | B25J 9/163 |
| 2021/0252714 A1 | 8/2021 | Hayashi et al. | |
| 2021/0260755 A1* | 8/2021 | Kuratani | B25J 9/1664 |

FOREIGN PATENT DOCUMENTS

| | | | | |
|---|---|---|---|---|
| JP | 2020-082332 A | 6/2020 | | |
| WO | 2019/098044 A1 | 5/2019 | | |
| WO | WO-2021124445 A1 * | 6/2021 | | B25J 9/1612 |

\* cited by examiner

*Primary Examiner* — Wade Miles
*Assistant Examiner* — Jerrod Irvin Davis
(74) *Attorney, Agent, or Firm* — Harness, Dickey & Pierce, P.L.C.

(57) ABSTRACT

A method of adjusting an action parameter includes a positional posture determination step of making a robot execute a task a plurality of times in a plurality of positional postures different in positional posture of an object when starting the task to obtain evaluation values of the respective tasks, comparing the evaluation values of the tasks out of the evaluation values of the respective tasks with a reference evaluation value, and determining an evaluation positional posture from the positional postures in the tasks in which the evaluation value is no higher than the reference evaluation value, an updating step of making the robot operate with a tentative action parameter using the evaluation positional posture as a starting positional posture in the task to measure a time taken for the task or a vibration of the robot, and updating the tentative action parameter based on a measurement result, and a determination step of repeatedly performing the updating step until the time taken for the task or the vibration of the robot measured is converged to determine latest one of the tentative action parameters as an action parameter when actually performing the task.

4 Claims, 8 Drawing Sheets

FIG. 5
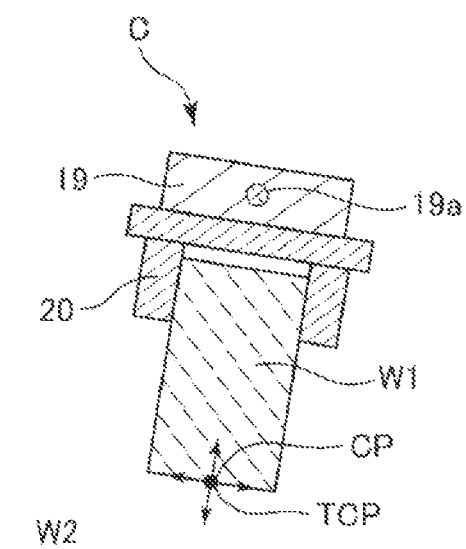
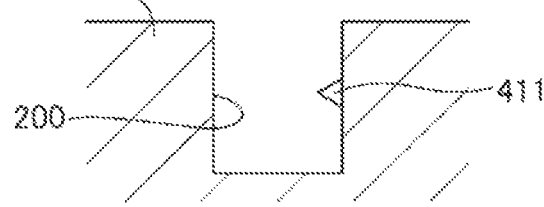
FIG. 6
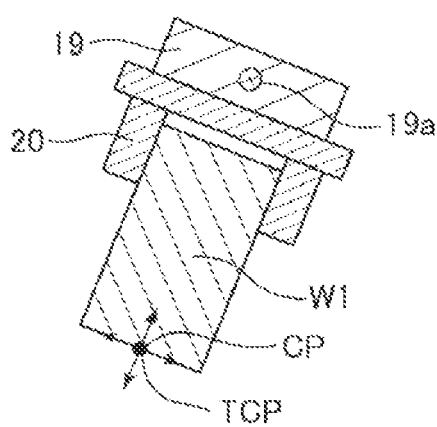
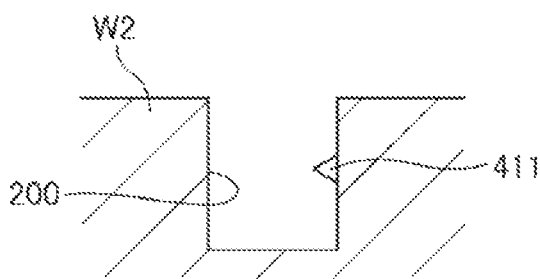

FIG. 8

| AXIS | UPPER LIMIT | LOWER LIMIT |
|---|---|---|
| X | $+a_x$ | $-a_x$ |
| Y | $+a_y$ | $-a_y$ |
| Z | $+a_z$ | $-a_z$ |
| U | $+a_u$ | $-a_u$ |
| V | $+a_v$ | $-a_v$ |
| W | $+a_w$ | $-a_w$ |

FIG. 9

| AXIS | EVALUATION POSITIONAL POSTURE |
|---|---|
| X | $-a_x$ |
| Y | $+a_y$ |
| Z | $-a_z$ |
| U | $+a_u$ |
| V | $+a_v$ |
| W | $+a_w$ |

FIG. 10

| AXIS | EVALUATION POSITIONAL POSTURE |
|---|---|
| X | $-a_x$ |
| Y | $+a_y$ |
| Z | $-a_z$ |
| U | $+a_u$ |
| V | $+a_v$ |
| W | $+a_w$ |
| X, Y, Z | $(-a_x, +a_y, -a_z)$ |
| U, V, W | $(+a_u, +a_v, +a_w)$ |
| X, Y, Z, U, V, W | $(-a_x, +a_y, -a_z, +a_u, +a_v, +a_w)$ |

FIG. 11

| AXIS | EVALUATION POSITIONAL POSTURE | DIFFICULTY |
|---|---|---|
| X, Y, Z, U, V, W | $(0, 0, 0, 0, 0, 0)$ | LOW DIFFICULTY |
| X | $-a_x$ | MEDIUM DIFFICULTY |
| Y | $+a_y$ | MEDIUM DIFFICULTY |
| Z | $-a_z$ | MEDIUM DIFFICULTY |
| U | $+a_u$ | MEDIUM DIFFICULTY |
| V | $+a_v$ | MEDIUM DIFFICULTY |
| W | $+a_w$ | MEDIUM DIFFICULTY |
| X, Y, Z | $(-a_x, +a_y, -a_z)$ | HIGH DIFFICULTY |
| U, V, W | $(+a_u, +a_v, +a_w)$ | HIGH DIFFICULTY |
| X, Y, Z, U, V, W | $(-a_x, +a_y, -a_z, +a_u, +a_v, +a_w)$ | HIGH DIFFICULTY |

METHOD OF ADJUSTING ACTION PARAMETER

The present application is based on, and claims priority from JP Application Serial Number 2021-146004, filed Sep. 8, 2021, the disclosure of which is hereby incorporated by reference herein in its entirety.

BACKGROUND

1. Technical Field

The present disclosure relates to a method of adjusting an action parameter.

2. Related Art

There is known a robot which has a robot arm, and a force detection section for detecting a force applied to the robot arm, and which performs a predetermined task by performing force control of driving the robot arm based on the detection result in the force detection section. In such a robot, as described in, for example, International Publication No. WO 2019/098044, it is necessary to set a force control parameter for determining in what mode the robot arm is driven to an appropriate value when performing the force control.

In order to set the force control parameter to the appropriate value, there is required a process of repeating the task on a trial basis while changing the force control parameter to thereby take it out what force control parameter is suitable for that task. However, in such a method, a variety of conditions such as the number of the works, a type of the works, a positional posture of the robot arm during the task are limited, and it results in that there is obtained the force control parameter with which a required performance is exerted only in an overfitting state, namely under a specific condition in which no variation exists in the object and the robot. In other words, the force control parameter described above comes to what is not suitable for an actual operation in which a manufacturing variation and a gripping variation exist. As described above, it is difficult for even a skilled person to set the force control parameter with which the suitable force required and the task time are balanced as a productivity requirement required for the force control.

SUMMARY

A method of adjusting an action parameter according to the present disclosure is a method of adjusting an action parameter configured to make a robot operate to determine the action parameter to be set to the robot when performing a task using an object, the method including a positional posture determination step of making the robot execute the task a plurality of times while changing a positional posture of the object when starting the task to obtain evaluation values of the respective tasks, comparing the evaluation values of the plurality of tasks obtained with a reference evaluation value, and determining an evaluation positional posture from the positional postures of the object in which the evaluation value is no higher than the reference evaluation value, an updating step of making the robot operate with a tentative action parameter using the evaluation positional posture determined in the positional posture determination step as a start-up positional posture in the task, measuring a time taken for the task or a vibration of the robot, and updating the tentative action parameter based on the time taken for the task or the vibration of the robot measured, and a determination step of repeatedly performing the updating step until the time taken for the task or the vibration of the robot measured is converged, to determine latest one of the tentative action parameters as an action parameter when actually performing the task.

BRIEF DESCRIPTION OF THE DRAWINGS

FIG. 5 is a longitudinal cross-sectional view of the robot showing an example of the evaluation positional posture.

FIG. 6 is a longitudinal cross-sectional view of the robot showing an example of the evaluation positional posture.

FIG. 8 is a diagram for explaining a method of generating the evaluation positional posture.

FIG. 9 is a diagram for explaining the method of generating the evaluation positional posture.

FIG. 10 is a diagram for explaining the method of generating the evaluation positional posture.

FIG. 11 is a diagram for explaining the method of generating the evaluation positional posture.

DESCRIPTION OF AN EXEMPLARY EMBODIMENT

Embodiment

Figure 1:
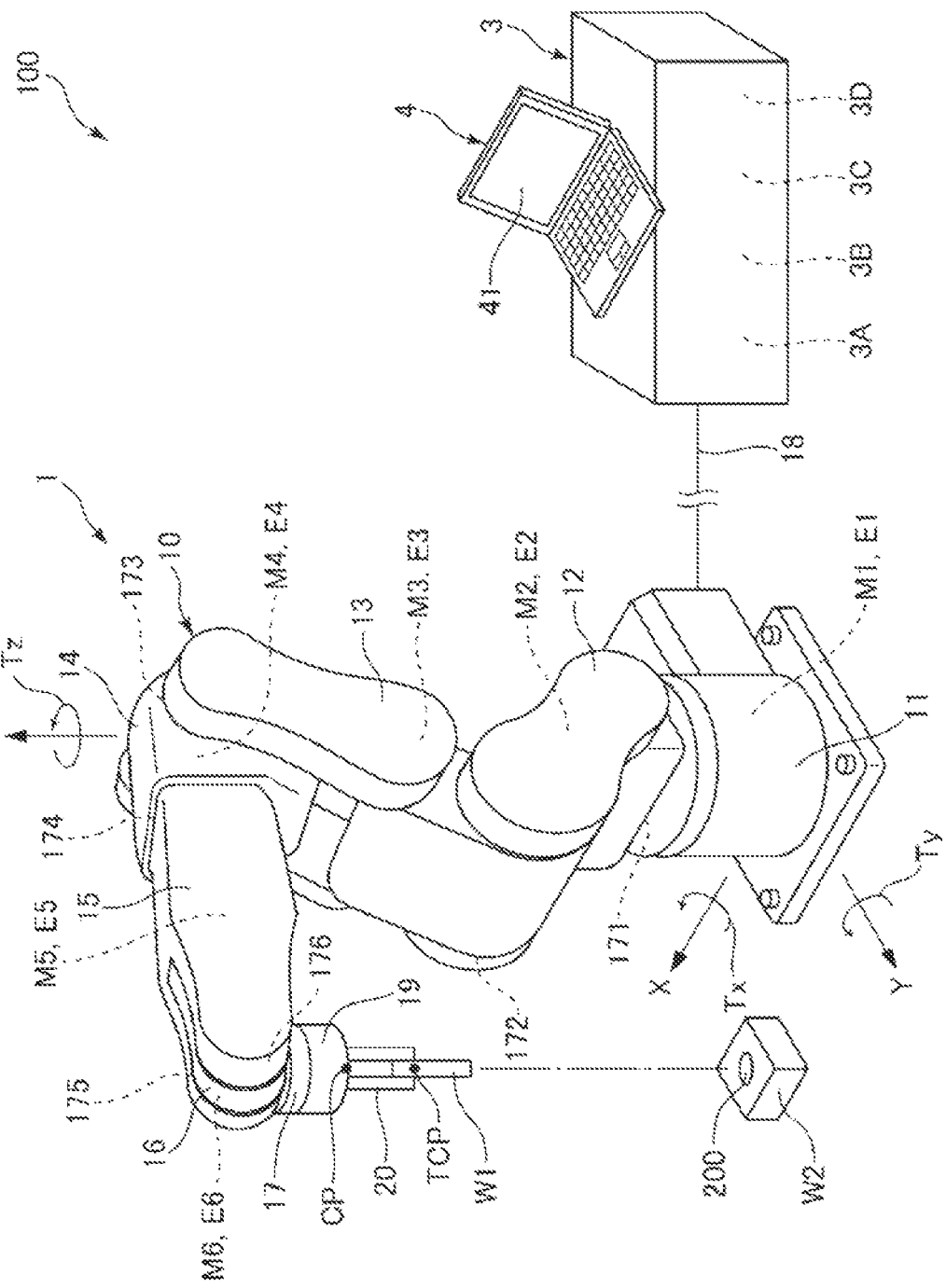
FIG. 1 is a diagram showing an overall configuration of a robotic system for executing a method of adjusting an action parameter according to the present disclosure.
Figure 2:
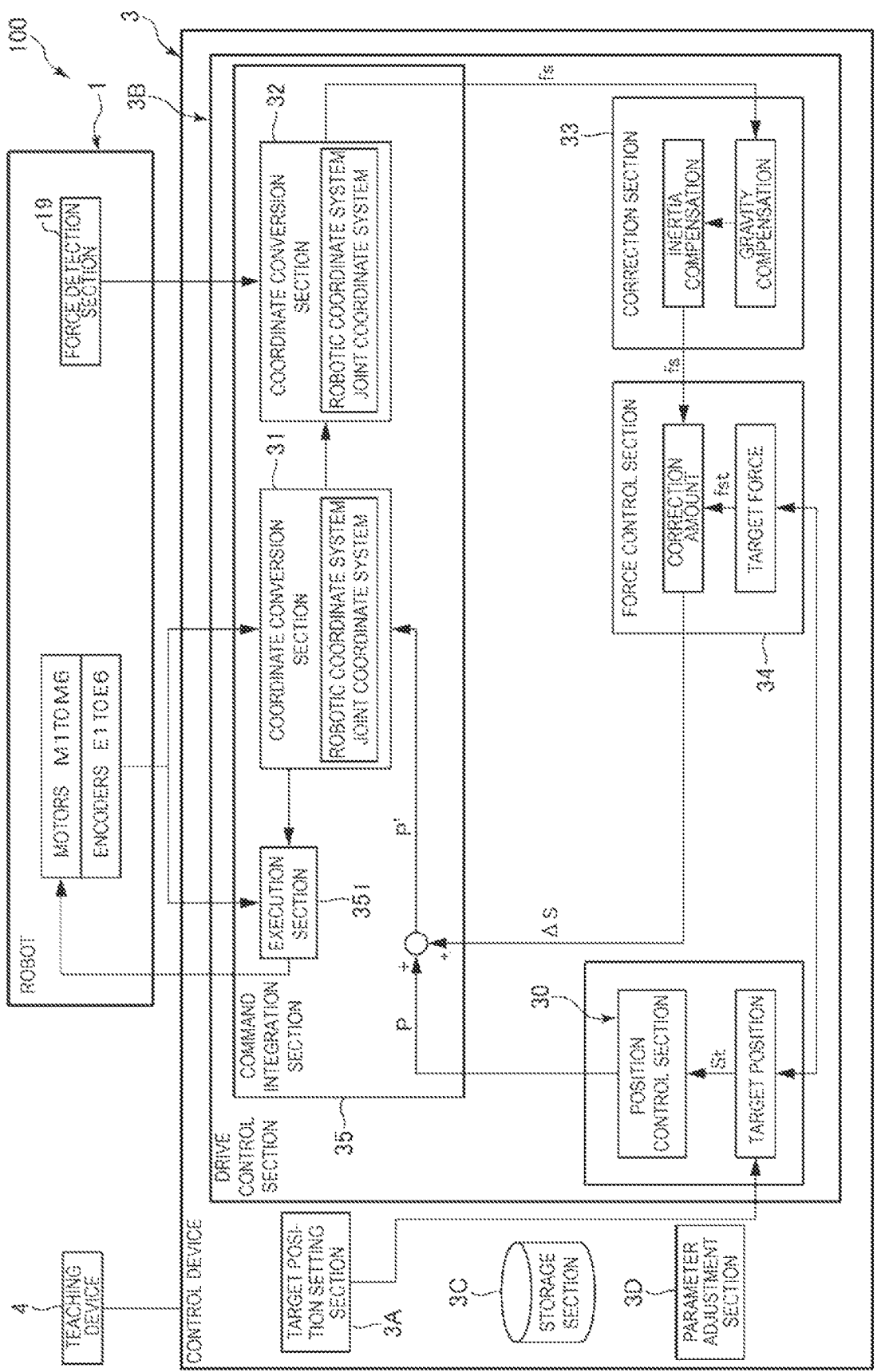
FIG. 2 is a block diagram of the robotic system shown in FIG. 1.
Figure 7:
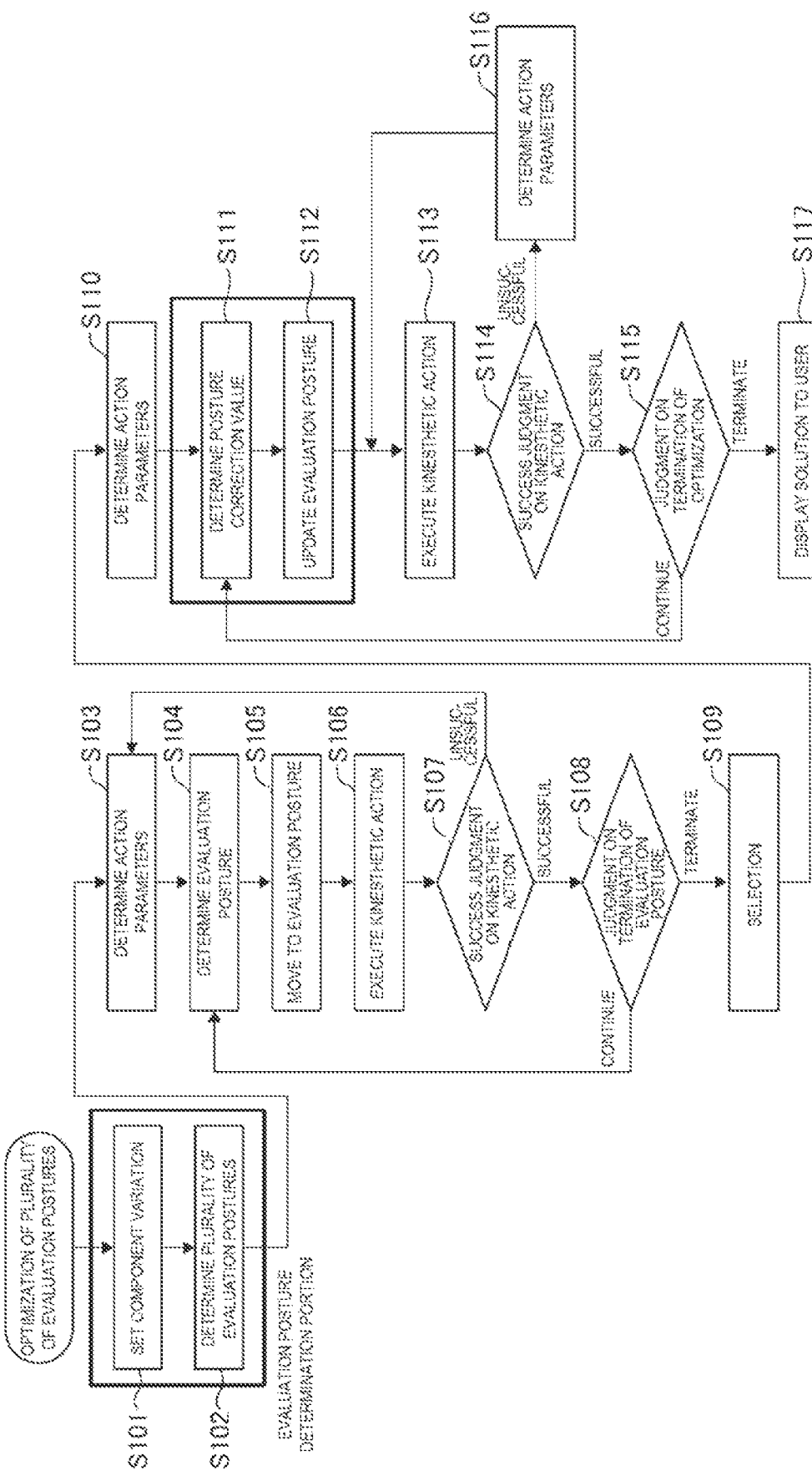
FIG. 7 is a flowchart for explaining a control operation to be executed by the robotic system shown in FIG. 1.

FIG. 1 is a diagram showing an overall configuration of a robotic system for executing a method of adjusting an action parameter according to the present disclosure. FIG. 2 is a block diagram of the robotic system shown in FIG. 1. FIG. 3 through FIG. 6 are each a longitudinal cross-sectional view of a robot showing an example of an evaluation positional posture. FIG. 7 is a flowchart for explaining a control operation to be executed by the robotic system shown in FIG. 1. FIG. 8 through FIG. 11 are each a diagram for explaining the method of generating the evaluation positional posture.

The method of adjusting the action parameter according to the present disclosure will hereinafter be described in detail based on a preferred embodiment shown in the accompanying drawings. It should be noted that hereinafter a +Z-axis direction, namely an upper side in FIG. 1, is also referred to as an "upper side," and a −Z-axis direction, namely a lower side thereof, is also referred to as a "lower side" for the sake of convenience of explanation. Further, regarding the robot arm, a platform 11 side in FIG. 1 is also referred to as a "base end," and an opposite side, namely an end effector side, is also referred to as a "tip." Further, the Z-axis direction, namely an up-down direction in FIG. 1, is defined as a "vertical direction," and the X-axis direction and the Y-axis direction, namely a right-left direction and a front-back direction, are defined as a "horizontal direction."

As shown in FIG. 1, a robotic system 100 is provided with a robot 1, a control device 3 for controlling the robot 1, and a teaching device 4, and executes the method of adjusting the action parameter according to the present disclosure.

First, the robot 1 will be described.

The robot 1 shown in FIG. 1 is a single-arm six-axis vertical articulated robot in the present embodiment, and has a platform 11 and a robot arm 10. Further, it is possible to mount an end effector 20 on a tip portion of the robot arm 10. The end effector 20 can be a configuration requirement of the robot 1, or is not required to be a configuration requirement of the robot 1.

It should be noted that the robot 1 is not limited to the illustrated configuration, and can be, for example, a double-arm articulated robot. Further, the robot 1 can be a horizontal articulated robot.

The platform 11 is a support body for supporting the robot arm 10 from a lower side so as to be able to drive the robot arm 10, and is fixed to, for example, a floor in a factory. In the robot 1, the platform 11 is electrically coupled to the control device 3 via a relay cable 18. It should be noted that the coupling between the robot 1 and the control device 3 is not limited to the coupling with wire as in the configuration shown in FIG. 1, but can be, for example, coupling without wire, or can also be connection via a network such as the Internet.

In the present embodiment, the robot arm 10 has a first arm 12, a second arm 13, a third arm 14, a fourth arm 15, a fifth arm 16, and a sixth arm 17, wherein these arms are coupled to one another in this order from the platform 11 side. It should be noted that the number of the arms provided to the robot arm 10 is not limited to six, and can be, for example, one, two, three, four, five, or seven or more. Further, a size such as a total length of each of the arms is not particularly limited, and can arbitrarily be set.

The platform 11 and the first arm 12 are coupled to each other via a joint 171. Further, the first arm 12 is arranged to be able to rotate around a first rotational axis parallel to the vertical direction with respect to the platform 11 taking the first rotational axis as a rotational center. The first rotational axis coincides with a normal line of the floor to which the platform 11 is fixed.

The first arm 12 and the second arm 13 are coupled to each other via a joint 172. Further, the second arm 13 is arranged to be able to rotate with respect to the first arm 12 taking a second rotational axis parallel to the horizontal direction as a rotational center. The second rotational axis is parallel to an axis perpendicular to the first rotational axis.

The second arm 13 and the third arm 14 are coupled to each other via a joint 173. Further, the third arm 14 is arranged to be able to rotate with respect to the second arm 13 taking a third rotational axis parallel to the horizontal direction as a rotational center. The third rotational axis is parallel to the second rotational axis.

The third arm 14 and the fourth arm 15 are coupled to each other via a joint 174. Further, the fourth arm 15 is arranged to be able to rotate with respect to the third arm 14 taking a fourth rotational axis parallel to a central axis direction of the third arm 14 as a rotational center. The fourth rotational axis is perpendicular to the third rotational axis.

The fourth arm 15 and the fifth arm 16 are coupled to each other via a joint 175. Further, the fifth arm 16 is arranged to be able to rotate with respect to the fourth arm 15 taking a fifth rotational axis as a rotational center. The fifth rotational axis is perpendicular to the fourth rotational axis.

The fifth arm 16 and the sixth arm 17 are coupled to each other via a joint 176. Further, the sixth arm 17 is arranged to be able to rotate with respect to the fifth arm 16 taking a sixth rotational axis as a rotational center. The sixth rotational axis is perpendicular to the fifth rotational axis.

Further, the sixth arm 17 forms a robot tip portion located at the farthest to the tip side in the robot arm 10. The sixth arm 17 can rotate together with the end effector 20 due to the drive of the robot arm 10.

The robot 1 is provided with a motor M1, a motor M2, a motor M3, a motor M4, a motor M5, and a motor M6 as a drive section, an encoder E1, an encoder E2, an encoder E3, an encoder E4, an encoder E5, and an encoder E6. The motor M1 is incorporated in the joint 171, and rotates the platform 11 and the first arm 12 relatively to each other. The motor M2 is incorporated in the joint 172, and rotates the first arm 12 and the second arm 13 relatively to each other. The motor M3 is incorporated in the joint 173, and rotates the second arm 13 and the third arm 14 relatively to each other. The motor M4 is incorporated in the joint 174, and rotates the third arm 14 and the fourth arm 15 relatively to each other. The motor M5 is incorporated in the joint 175, and rotates the fourth arm 15 and the fifth arm 16 relatively to each other. The motor M6 is incorporated in the joint 176, and rotates the fifth arm 16 and the sixth arm 17 relatively to each other.

Further, the encoder E1 is incorporated in the joint 171, and detects a position of the motor M1. The encoder E2 is incorporated in the joint 172, and detects a position of the motor M2. The encoder E3 is incorporated in the joint 173, and detects a position of the motor M3. The encoder E4 is incorporated in the joint 174, and detects a position of the motor M4. The encoder E5 is incorporated in the joint 175, and detects a position of the motor M5. The encoder E6 is incorporated in the joint 176, and detects a position of the motor M6.

The encoders E1 through the encoder E6 are electrically coupled to the control device 3, and positional information, namely an amount of rotation, of each of the motor M1 through the motor M6 is transmitted to the control device 3 as an electric signal. Further, based on this information, the control device 3 drives the motor M1 through the motor M6 via a motor driver not shown. In other words, controlling the robot arm 10 is controlling the motor M1 through the motor M6.

Further, at the tip of the robot arm 10, there is set a control point CP. The control point CP means a point acting as a reference when performing the control of the robot arm 10. In the robotic system 100, a position of the control point CP is figured out in a robotic coordinate system, and the robot arm 10 is driven so that the control point CP moves to a desired position.

Further, in the robot 1, the robot arm 10 is provided with a force detection section 19 for detecting the force in a detachable manner. Further, the robot arm 10 can be driven in a state in which the force detection section 19 is installed. The force detection section 19 is a six-axis kinesthetic sensor in the present embodiment. The force detection section 19 detects magnitudes of forces on three detection axes perpendicular to each other, and magnitudes of torques around the respective three detection axes. Specifically, the force detection section 19 detects force components in the respective axial directions of the X axis, the Y axis, and the Z axis perpendicular to each other, a force component in a Tx direction (a U direction) around the X axis, a force component in a Ty direction (a V direction) around the Y axis, and a force component in a Tz direction (a W direction) around the Z axis. It should be noted that in the present embodiment, the Z-axis direction corresponds to a vertical direction. Further, the force component in each of the axial directions can also be referred to as a "translational force component," and the force component around each of the axes can also be referred to as a "rotational force component." Further, the force detection section 19 is not limited to the six-axis kinesthetic sensor, and can be one having another configuration.

In the present embodiment, the force detection section 19 is provided to the sixth arm 17. It should be noted that the installation place of the force detection section 19 is not limited to the sixth arm 17, namely the arm located at the farthest to the tip side, and can be, for example, another arm, an area between the arms adjacent to each other, or a place below the platform 11, or it is possible to provide the force detection section 19 to each of the joints.

It is possible to detachably mount the end effector 20 on the force detection section 19. The end effector 20 is formed of a hand which makes a pair of claws get closer to each other or get away from each other to thereby grip an object, but this is not a limitation in the present disclosure, and it is possible for the end effector 20 to have more than two claws. Further, it is possible to adopt a hand for gripping an object with suction.

Further, in the robotic coordinate system, a tool center point TCP is set at an arbitrary position at the tip of the end effector 20, preferably at the tip in the state in which the claws get closer to each other. As described above, in the robotic system 100, the position of the control point CP is figured out in the robotic coordinate system, and the robot arm 10 is driven so that the control point CP moves to the desired position. Further, by figuring out a type, in particular a length, of the end effector 20 in advance, it is possible to figure out an amount of an offset between the tool center point TCP and the control point CP. Therefore, it is possible to figure out the position of the tool center point TCP in the robotic coordinate system. Therefore, it is possible to use the tool center point TCP as a reference of the control.

Further, as shown in FIG. 1, the robot 1 performs a task of gripping a work W1 as a first object, and then inserting the work W1 into a work W2 as a second object to fit the work W1 into the work W2. Here, "fitting" is used not only as fitting in a narrow sense, but also as a broad concept including insertion, engagement, and so on. Therefore, depending on the configurations of the work W1 and the work W2, it is possible to reword "fitting" as "insertion," "engagement," and so on. It should be noted that it is possible to adopt a task of gripping the work W2 to insert the work W1 to the work W2.

The work W1 is a rod-like body having a circular lateral cross-sectional shape. It should be noted that the lateral cross-sectional shape of the work W1 can be a triangular shape, a quadrangular shape, or a polygonal shape having more than four angles, and the work W1 can also be a connector of electronic equipment, plastic exterior equipment, or the like. The work W2 is shaped like a block having an insertion hole 200 to which the work W1 is inserted.

Further, as shown in FIG. 3 through FIG. 6, in the insertion hole 200 of the work W2, there is disposed a snapping mechanism 411 acting as a resistive force when inserting the work W1. The function of the snapping mechanism 411 is exerted by a component itself in some cases in an actual usage in the insertion of a connector or assembling of a plastic component. Here, the snapping mechanism 411 is separately shown as a functional component.

Then, the control device 3 and the teaching device 4 will be described.

The control device 3 is arranged at a distance from the robot 1, and can be constituted by a computer incorporating a CPU (Central Processing Unit) as an example of a processor, and so on. The control device 3 can be incorporated in the platform 11 of the robot 1.

The control device 3 is coupled to the robot 1 with the relay cable 18 so as to be able to communicate with each other. Further, the control device 3 is coupled to the teaching device 4 so as to be able to communicate with each other wirelessly or with a cable. The teaching device 4 can be a dedicated computer, or can also be a general-purpose computer in which a program for teaching the robot 1 is installed. It is possible to use, for example, a teaching pendant as a dedicated device for teaching the robot 1 instead of the teaching device 4. Further, it is possible for the control device 3 and the teaching device 4 to be provided with respective chassis separated from each other, or to be configured integrally with each other.

Further, in the teaching device 4, a program for generating an execution program which uses a target positional posture Stand a target force $f_{St}$ described later as parameters, and then loading the execution program to the control device 3 can be installed. The teaching device 4 is provided with a display, a processor, a RAM, and a ROM, and these hardware resources generate the execution program in cooperation with the teaching program.

As shown in FIG. 2, the control device 3 is a computer in which the control program for performing the control of the robot 1 is installed. The control device 3 is provided with a processor, and a RAM and a ROM not shown, and these hardware resources cooperate with a program to thereby control the robot 1.

Further, as shown in FIG. 2, the control device 3 has a target position setting section 3A, a drive control section 3B, a storage section 3C, and a parameter adjustment section 3D. The storage section 3C is constituted by, for example, a volatile memory such as a RAM (Random Access Memory), a nonvolatile memory such as a ROM (Read Only Memory), and a removable external storage device. The storage section 3C stores an operation program for making the robot 1 operate such as a program for executing the method of adjusting the action parameter according to the present disclosure.

The target position setting section 3A sets the target positional posture $S_t$ and an action path for executing a predetermined task on the work W1. The target position setting section 3A sets the target positional posture $S_t$ and the action path based on the teaching information input from the teaching device 4, and so on.

The drive control section 3B is for controlling the drive of the robot arm 10, and has a position control section 30, a coordinate conversion section 31, a coordinate conversion section 32, a correction section 33, a force control section 34, and a command integration section 35.

The position control section 30 generates a position command signal for controlling a position of the tool center point TCP of the robot 1, namely a position command value P, based on the target position designated using a command created in advance.

Here, the control device 3 is capable of controlling the action of the robot 1 using force control and so on. The "force control" means control of an action of the robot 1 of changing a position of the end effector 20, namely a position of the tool center point TCP, and postures of the first arm 12 through the sixth arm 17 based on the detection result of the force detection section 19.

The force control includes, for example, force trigger control and impedance control. In the force trigger control, the force detection is performed by the force detection section 19, and the robot arm 10 is made to perform an action such as a displacement or a change in posture until a predetermined force is detected by the force detection section 19.

The impedance control includes imitation control. First, in a brief description, in the impedance control, the action of the robot arm 10 is controlled so as to keep the force applied to the tip portion of the robot arm 10 at a predetermined force as precisely as possible, namely so as to keep the force in a predetermined direction detected by the force detection section 19 at the target force $f_{St}$ as precisely as possible. Thus, for example, when the impedance control is performed on the robot arm 10, the robot arm 10 performs an action imitating an external force applied from the object or an operator with respect to the predetermined direction. It should be noted that the target force $f_{St}$ includes 0. For example, as one of the settings when performing the imitation action, it is possible to set the target value to "0." It should be noted that it is possible to set the target force $f_{St}$ to a numerical value other than 0. It is possible for the operator to arbitrarily set the target force $f_{St}$.

The storage section 3C stores a correspondence relationship between a combination of rotational angles of the motor M1 through the motor M6, and a position of the tool center point TCP in the robotic coordinate system. Further, the control device 3 stores at least one of the target positional posture $S_t$ and the target force $f_{St}$ in the storage section 3C based on a command in every step of a task performed by the robot 1. The command using the target positional posture $S_t$ and the target force $f_{St}$ as parameters is set in every step of the task performed by the robot 1.

The drive control section 3B controls the first arm 12 through the sixth arm 17 so that the target positional posture $S_t$ and the target force $f_{St}$ thus set are achieved at the tool center point TCP. The target force $f_{St}$ means a force and a torque detected by the force detection section 19 to be achieved by actions of the first arm 12 through the sixth arm 17. Here, the character "S" is assumed to represent any one of the directions (X, Y, and Z) of the axes defining the robotic coordinate system. Further, it is assumed that the character S also represents a position in the S direction. For example, in the case of S=X, the X direction component of the target position set in the robotic coordinate system becomes $S_t=X_t$, and the X direction component of the target force becomes $f_{St}=f_{Xt}$.

Further, in the drive control section 3B, when the rotational angles of the motor M1 through the motor M6 are obtained, the coordinate conversion section 31 shown in FIG. 2 converts the rotational angles into the positional posture S (X, Y, Z, U, V, or W) at the tool center point TCP in the robotic coordinate system based on the correspondence relationship. Then, the coordinate conversion section 32 identifies an acting force $f_S$ actually acting on the force detection section 19 in the robotic coordinate system based on the positional posture S of the tool center point TCP and the detection value of the force detection section 19.

An acting point of the acting force $f_S$ is defined as a force detection origin separately from the tool center point TCP. The force detection origin corresponds to a point at which the force detection section 19 is detecting a force. It should be noted that the control device 3 stores a correspondence relationship which defines a direction of a detection axis in a sensor coordinate system of the force detection section 19 for every positional posture S of the tool center point TCP in the robotic coordinate system. Therefore, it is possible for the control device 3 to identify the acting force $f_S$ in the robotic coordinate system based on the positional posture S of the tool center point TCP in the robotic coordinate system and the correspondence relationship. Further, the torque acting on the robot 1 can be calculated from the acting force $f_S$ and a distance from the contact point to the force detection section 19, and is identified as a torque component. It should be noted that when the end effector 20 makes contact with the work W1 to perform a task, the contact point can be assumed as the tool center point TCP.

The correction section 33 performs a gravity compensation on the acting force $f_S$. The gravity compensation means elimination of a component of a force or a torque caused by the gravity from the acting force $f_S$. The acting force $f_S$ on which the gravity compensation has been performed can be assumed as a force other than the gravity acting on the robot arm 10 or the end effector 20.

Further, the correction section 33 performs an inertia compensation on the acting force $f_S$. The inertia compensation means elimination of a component of a force or a torque caused by an inertial force from the acting force $f_S$. The acting force $f_S$ on which the inertia compensation has been performed can be assumed as a force other than the inertial force acting on the robot arm 10 or the end effector 20.

The force control section 34 performs the impedance control. The impedance control is active impedance control which realizes an imaginary mechanical impedance with the motor M1 through the motor M6. The control device 3 performs such impedance control when performing direct teaching and a step in a contact state in which the end effector 20 receives a force from the work as the object such as a fitting task of the work, a screwing task, or a polishing task. It should be noted that besides such a step, by performing the impedance control when, for example, a human makes contact with the robot 1, it is possible to enhance the safety.

In the impedance control, the target force $f_{St}$ is substituted into a motion equation described later to derive the rotational angles of the motor M1 through the motor M6. Signals with which the control device 3 controls the motor M1 through the motor M6 are each a signal modulated with PWM
(Pulse Width Modulation).

Further, in a step in a non-contact state in which the end effector 20 does not receive an external force, the control device 3 controls the motor M1 through the motor M6 with the rotational angles derived by a linear operation from the target positional posture $S_t$. A mode in which the motor M1 through the motor M6 are controlled with the rotational angles derived by the linear operation from the target positional posture $S_t$ is referred to as a position control mode.

The control device 3 substitutes the target force $f_{St}$ and the acting force $f_S$ into the motion equation of the impedance control to thereby identify a force-derived correction value $\Delta S$. The force-derived correction value $\Delta S$ means a magnitude of a displacement of the positional posture S which the tool center point TCP should make for dissolving a force deviation $\Delta f_S(t)$ from the target force $f_{St}$ when the tool center point TCP has received the mechanical impedance. The following formula (1) is the motion equation of the impedance control.

$$m\Delta\ddot{S}(t)+d\Delta\dot{S}(t)+k\Delta S(t)=\Delta f_S(t) \quad (1)$$

The left-hand side of the formula (1) is constituted by a first term in which a second order differential value of the positional posture S of the tool center point TCP is multiplied by a virtual mass coefficient m (hereinafter referred to as a "mass coefficient m"), a second term in which a differential value of the positional posture S of the tool center point TCP is multiplied by a virtual viscosity coefficient d (hereinafter referred to as a "viscosity coefficient d"), and a third term in which the positional posture S of the tool center point TCP is multiplied by a virtual elastic coefficient k (hereinafter referred to as an "elastic coefficient k"). The right-hand side of the formula (1) is formed of the force deviation $\Delta f_S(t)$ obtained by subtracting the actual force f from the target force $f_{St}$. The differential in formula (1) means the temporal differentiation. In the step performed by the robot, a constant value is set as the target force $f_{St}$ in some cases, and a function of time is set as the target force $f_{St}$ in some cases.

The mass coefficient m means a mass which the tool center point TCP virtually has, the viscosity coefficient d means a viscosity resistance which the tool center point TCP virtually receives, and the elastic coefficient k means a spring constant of the elastic force which the tool center point TCP virtually receives.

As the value of the mass coefficient m increases, the acceleration of the action decreases, and as the value of the mass coefficient m decreases, the acceleration of the action increases. As the value of the viscosity coefficient d increases, the speed of the action decreases, and as the value of the viscosity coefficient d decreases, the speed of the action increases. As the value of the elastic coefficient k increases, the elasticity increases, and as the value of the elastic coefficient k decreases, the elasticity decreases.

The mass coefficient m, the viscosity coefficient d, and the elastic coefficient k can each be set to values different by direction, or can each also be set to a common value irrespective of the direction. Further, it is possible for the operator to arbitrarily set the mass coefficient m, the viscosity coefficient d, and the elastic coefficient k prior to the task.

The mass coefficient m, the viscosity coefficient d, and the elastic coefficient k described above are each a force control parameter. The force control parameter is a value set in advance of the robot arm 10 actually performing a task. The force control parameters include, for example, such a target force $f_{St}$ as described above besides the mass coefficient m, the viscosity coefficient d, and the elastic coefficient k.

As described above, in the robotic system 100, during the execution of the force control, the correction value is obtained from the detection value of the force detection section 19, the force control parameters set in advance, and the target force $f_{St}$ set in advance. This correction value means the force-derived correction value ΔS described above, and means a difference between the position at which the external force is received, and a position to which the tool center point TCP should be moved.

Further, the command integration section 35 combines the force-derived correction value ΔS with a position command value P generated by the position control section 30. By performing the above as needed, the command integration section 35 obtains a new position command value P' from the position command value P which has been used for the displacement to the position at which the external force is received.

Then, by the coordinate conversion section 31 converting the new position command value P' into the robotic coordinate and then an execution section 351 executing the operation, it is possible to move the tool center point TCP to the position reflecting the force-derived correction value ΔS to thereby respond to the external force, and thus relax the further load applied to the object which has made contact with the robot 1.

According to such a drive control section 3B, it is possible to drive the robot arm 10 so that the tool center point TCP moves until the target force $f_{St}$ becomes a value set in advance while moving the tool center point TCP toward the target positional posture $S_t$ in the state of gripping the work W1. Specifically, it is possible to perform the insertion task until the work W1 is inserted in the insertion hole 200 of the work W2 and the target force $f_{St}$ set in advance is detected to thereby complete the insertion task. Further, in the insertion process, by performing such force control as described above, it is possible to prevent or suppress an excessive load from being applied to the work W1 and the work W2.

As described later, the parameter adjustment section 3D shown in FIG. 2 adjusts the action parameters.

Here, the operator is required to set appropriate action parameters before performing the task in accordance with the content of the task and the types of the work W1 and the work W2. The action parameters include the force control parameters, position control parameters, and so on. As described above, the force control parameters include the mass coefficient m, the viscosity coefficient d, the elastic coefficient k, the target force $f_{St}$, and so on. The position control parameters are parameters to be set when performing the position control, and include the speed, the acceleration, and so on of the tool center point TCP.

By setting these to appropriate values, it is possible to set the mode of the robot arm 10 in operation to a mode suitable for the task, and thus, it is possible to perform an accurate task in a desired task time without applying an excessive load to the work W1 and the work W2.

However, it is difficult to set the action parameters to appropriate values, and in the related art, it is necessary to perform the task on a trial basis to set the appropriate values of the force control parameters in a blind way through a trial and error process until a desired task result such as the task time is achieved while changing the force control parameters a number of times based on the task result. In such a method, a variety of conditions such as the number of the works, a type of the works, a positional posture of the robot arm 10 during the task are limited, and it results in that there are obtained the action parameters with which a required performance is exerted only in an overfitting state, namely under a specific condition in which no variation exists in the works and the robot. In other words, the action parameters described above come to what is not suitable for an actual operation in which a manufacturing variation and a gripping variation exist. As described above, it is difficult for even a skilled person to set the force control parameters with which the suitable force required and the task time are balanced as a productivity requirement required for the force control. In contrast, in the present disclosure, it is possible to solve the problem in the following manner.

An example of the method of adjusting the action parameter according to the present disclosure will hereinafter be described using a flowchart shown in FIG. 7. It should be noted that although the description will hereinafter be presented using the force control parameters as an example of the action parameters, this is not a limitation in the present disclosure, the method can also be applied to the position control parameters described above.

The control device 3 and the teaching device 4 perform a share of the following steps in the present embodiment, this is not a limitation in the present disclosure, it is possible to adopt a configuration in which either one of the control device 3 and the teaching device 4 executes the following steps.

Figure 3:
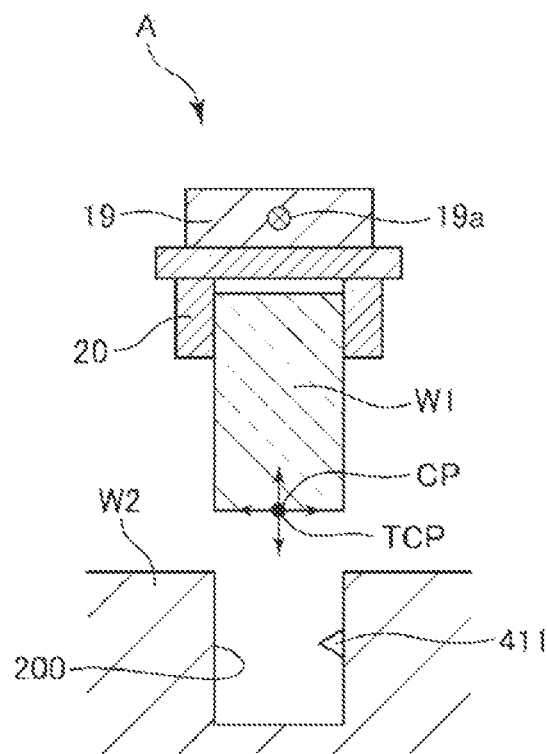
FIG. 3 is a longitudinal cross-sectional view of a robot showing an example of an evaluation positional posture.
Figure 4:
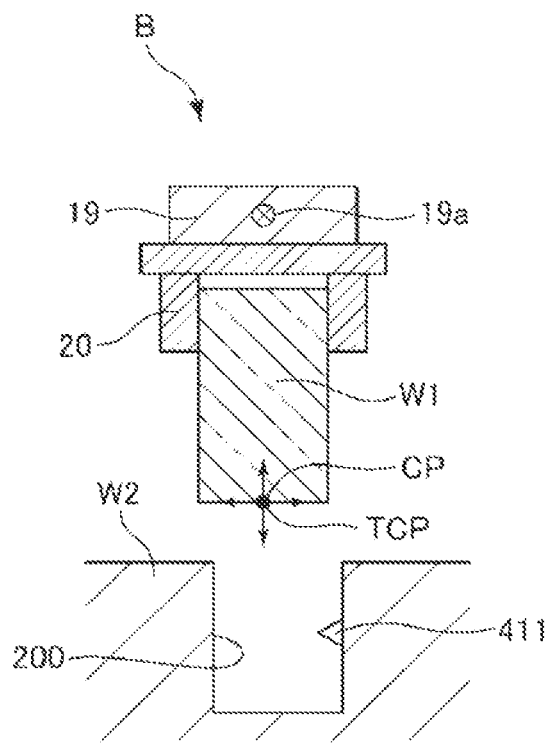
FIG. 4 is a longitudinal cross-sectional view of the robot showing an example of the evaluation positional posture.

In the step S101, there is performed setting of a component variation, namely setting of a variation in positional posture of the work W1 at the start-up of the task. For example, the user inputs such an ideal positional posture of the work W1 at the start-up of the task as shown in FIG. 3, and a range of the variation in the positional posture. The input is performed using, for example, the teaching device 4.

The range of the variation in the positional posture means an upper limit and a lower limit of a rotational angle around each of the X axis, the Y axis, the Z axis, the U axis, the V axis, and the W axis. It is assumed hereinafter that there are input the upper limit around the X axis as $+a_x$, the lower limit around the X axis as $-a_x$, the upper limit around the Y axis as $+a_y$, the lower limit around the Y axis as $-a_y$, the upper limit around the Z axis as $+a_z$, the lower limit around the Z axis as $-a_z$, the upper limit around the U axis as $+a_u$, the lower limit around the U axis as $-a_u$, the upper limit around the V axis as $+a_v$, the lower limit around the V axis as $-a_v$, the upper limit around the W axis as $+a_w$, the lower limit around the W axis as $-a_w$ as shown in FIG. 8.

Then, in the step S102, the parameter adjustment section 3D performs the determination of the plurality of evaluation positional postures. Specifically, the variation is provided to the positional posture at the start-up of the task of the robot arm 10 gripping the work W1 (see FIG. 4 through FIG. 6). The positional postures at the start-up of the task shown in FIG. 3 through FIG. 6 are hereinafter also referred to as the evaluation positional postures.

A positional posture worse in evaluation value in each of the axes than the evaluation positional posture shown in FIG. 3 is determined as the evaluation positional posture (see FIG. 6). Specifically, as shown in FIG. 9, the positional posture around the X axis is set to $-a_x$, the positional posture around the Y axis is set to $+a_y$, the positional posture around the Z axis is set to $-a_z$, the positional posture around the U axis is set to $+a_u$, the positional posture around the V axis is set to $+a_v$, and the positional posture around the W axis is set to $+a_w$.

Then, a positional posture obtained by combining a translational direction and a rotational direction with each other is added as the evaluation positional posture. Specifically, as shown in FIG. 10, there is added the evaluation positional posture (see FIG. 4) in which the positional posture around the X axis is set to $-a_x$, the positional posture around the Y axis is set to $+a_y$, the positional posture around the Z axis is set to $-a_z$, the positional posture around the U axis is set to $+a_u$, the positional posture around the V axis is set to $+a_v$, and the positional posture around the W axis is set to $+a_w$. Further, there is added the evaluation positional posture (see FIG. 5) in which the positional posture around the X axis is set to $-a_x$, the positional posture around the Y axis is set to $+a_y$, the positional posture around the Z axis is set to $-a_z$, the positional posture around the U axis is set to $+a_u$, the positional posture around the V axis is set to $+a_v$, and the positional posture around the W axis is set to $+a_w$.

Then, there is added the evaluation positional posture the lowest in difficulty, namely the evaluation positional posture (see FIG. 3) in which the positional posture around the X axis is set to 0, the positional posture around the Y axis is set to 0, the positional posture around the Z axis is set to 0, the positional posture around the U axis is set to 0, the positional posture around the V axis is set to 0, and the positional posture around the W axis is set to 0.

In such a manner, it is possible to obtain the evaluation positional postures shown in FIG. 3 through FIG. 6. The evaluation positional posture A shown in FIG. 3 is the positional posture the lowest in difficulty of the task out of the four evaluation positional postures. The evaluation positional posture D shown in FIG. 6 is the positional posture the highest in difficulty of the task out of the four evaluation positional postures. The evaluation positional posture B shown in FIG. 4 and the evaluation positional posture C shown in FIG. 5 are higher in difficulty of the task than the evaluation positional posture A shown in FIG. 3, and lower in difficulty of the task than the evaluation positional posture D shown in FIG. 6.

By performing the adjustment using such a plurality of evaluation positional postures during the optimization of the action parameters in the step described later, it is possible to obtain stable and optimum parameters. In particular, by setting the evaluation positional postures in incremental steps of the difficulty of the task, and at the same time, so as to include the evaluation positional posture high in difficulty of the task instead of randomly setting the four evaluation positional postures, it is possible to set more appropriate action parameters.

Subsequently, in the step S103, the parameter adjustment section 3D determines the action parameters. It should be noted that in the step S103 in the first loop, the action parameters are determined as initial action parameters set in advance, namely tentative action parameters.

Subsequently, in the step S104, the parameter adjustment section 3D determines the evaluation positional posture. For example, it is possible to determine the evaluation positional posture in the order in which the evaluation positional posture A is determined in the first loop, the evaluation positional posture B is determined in the second loop, the evaluation positional posture C is determined in the third loop, and the evaluation positional posture D is determined in the fourth loop. It should be noted that this order is not a limitation.

Subsequently, in the step S105, the drive control section 3B moves the robot arm 10 to the evaluation positional posture determined in the step S104. Specifically, the robot arm 10 which grips the work W1 is driven so that the positional posture of the robot arm 10 becomes the evaluation positional posture determined in the step S104.

Then, in the step S106, the drive control section 3B makes the robot arm 10 execute a kinesthetic action. In other words, the robot arm 10 executes the designated task with the force control. Then, in the step S107, a success judgment of the kinesthetic action is performed. When it is determined successful in the step S107, the process proceeds to the step S108, and when it is determined unsuccessful in the step S107, the process proceeds to the step S103.

In the step S108, the parameter adjustment section 3D determines whether to terminate the task. The judgment in the present step is made based on whether the task has been performed in all of the four evaluation positional postures, namely whether or not the loop of the step S103 through the step S107 has been performed four times. When it is determined that the task is to be terminated in the step S108, the process proceeds to the step S109, and when it is determined that the task is not to be terminated in the step S108, the process proceeds to the step S104.

Then, in the step S109, the parameter adjustment section 3D performs an optimization of the force control parameters. Specifically, the evaluation values of the four tasks are obtained, and then the evaluation value of each of the tasks is compared to a reference evaluation value. Further, one positional posture is determined out of the positional postures described above in the task in which the evaluation value is no higher than the reference evaluation value.

The evaluation value is a value for evaluating the quality of the task in a stepwise manner, and for example, when n levels are set between the highest and the lowest, it is assumed that the first level corresponds to a bottom evaluation, and the n-th level corresponds to a peak evaluation.

It should be noted that the reference evaluation value is a value set in advance, and is a criterial value for determining whether the evaluation value represents good quality or bad quality. The reference evaluation value is, for example, a numerical value from 1 to n.

As described above, in the present step, the best evaluation value is not used, but the evaluation positional posture relatively low in evaluation value is intentionally selected. Such steps S101 through S109 correspond to a positional posture determination step.

Then, in the step S110, the parameter adjustment section 3D determines the action parameters suitable for the task which is executed using the positional posture selected in the step S109 as a start-up positional posture. In the present step, for example, the determination is made based on, for example, a table representing the relationship between the start-up positional posture and the action parameters, and a calibration curve.

Subsequently, in the step S111, the parameter adjustment section 3D determines a positional posture correction value. Specifically, an amount of the variation to be provided to the positional posture selected in the step S109 is determined, and then the evaluation positional posture is updated in the step S112. Such steps S111 and S112 correspond to an updating step.

Then, in the step S113, the drive control section 3B makes the robot arm 10 execute a kinesthetic action using the action parameters calculated with an optimization algorithm. In other words, the robot arm 10 executes the designated task with the force control. Then, in the step S114, a success judgment of the kinesthetic action is performed. When it is determined successful in the step S114, the process proceeds to the step S115, and when it is determined unsuccessful in the step S114, the process proceeds to the step S116.

As the optimization algorithm, there can be cited a Nelder-Mead method, a Newton method, a covariance matrix adaptation evolution strategy, a particle swarm optimization, a Bayesian optimization method, and so on.

By performing a multipurpose optimization while appropriately setting an allocation ratio to the respective input values constituting the evaluation function to the optimization algorithm, it is possible to reduce the number of times of the task necessary for the convergence.

It should be noted that in the step S113, when executing the kinesthetic action, the time necessary for the task or a vibration of the robot 1 is measured.

Then, in the step S116, the parameter adjustment section 3D determines the action parameters based on the time necessary for the task or the vibration of the robot 1 obtained in the step S113. In other words, the parameter adjustment section 3D updates the tentative action parameters based on the time necessary for the task or the vibration of the robot 1 thus measured. The determination in the present step is made based on a table representing the relationship between, for example, the time necessary for the task or the vibration of the robot 1 thus measured and the action parameters corresponding thereto. Then, the process returns to the step S113.

In the step S115, the parameter adjustment section 3D determines whether or not the optimization has been completed. The judgment in the present step is made based on the time necessary for the task thus measured or whether or not the vibration of the robot 1 has been converged. For example, when a state in which a difference between the time taken to execute the task n times and the time taken to execute the task n-1 times is no more than a predetermined value occurs a predetermined times in a row, it is possible to assume that the convergence is achieved.

In the present step, the user inputs the component variation for each of the axes, and the evaluation positional posture is determined based on the range of the variation.

When it has been determined in the step S115 that the optimization is completed, the solution is displayed to the user in the step S117 using, for example, the teaching device 4. It should be noted that when it has been determined in the step S115 that the optimization is not completed, the process returns to the step S111 to sequentially repeat the subsequent steps. Such steps S111 through S116 correspond to the determination step.

As described above, the method of adjusting the action parameter according to the present disclosure is a method of adjusting the action parameter of making the robot 1 operate to determine the action parameter to be set to the robot 1 when performing a task using the work W1 as the object, the method including the positional posture determination step of making the robot 1 execute the task a plurality of times while changing the positional posture of the work W1 when starting the task to obtain the evaluation values of the respective tasks, comparing the evaluation values of the plurality of tasks thus obtained with a reference evaluation value, and determining the evaluation positional posture from the positional postures of the object in which the evaluation value is no higher than the reference evaluation value, the updating step of making the robot 1 operate with the tentative action parameters using the positional posture determined in the positional posture determination step as the start-up positional posture in the task, measuring the time taken for the task or the vibration of the robot 1, and updating the tentative action parameter based on the time taken for the task or the vibration of the robot 1 thus measured, and the determination step of repeatedly performing the updating step until the time taken for the task or the vibration of the robot 1 measured is converged to determine latest one of the tentative action parameters as the action parameter when actually performing the task. Thus, it is possible to appropriately and easily set the action parameter while omitting the task of repeating the task on a trial basis while changing the force control parameter to take it out what action parameter is suitable for the task as in the related art. In particular, by intentionally selecting the positional posture relatively low in evaluation value without using the best evaluation value in the positional posture determination step, it is possible to set the more accurate action parameter while preventing the overfitting.

Further, the robot 1 is provided with the robot arm 10 having the plurality of joints, and in the positional posture determination step, a variation is provided to the rotational angle of each of the joints to obtain the plurality of positional postures. Thus, it is possible to obtain the more appropriate evaluation positional posture, and thus, it is possible to set the more appropriate action parameter.

Further, the task includes the action of the robot 1 using the force control, and the action parameter includes the force control parameter. Thus, it is possible to set a more appropriate force control parameter.

Further, the force control parameter includes at least one of the target force, the virtual viscosity coefficient, the virtual elastic coefficient, and the virtual mass coefficient. Thus, it is possible to set a more appropriate force control parameter.

Another Configuration Example of Robotic System

Figure 12:
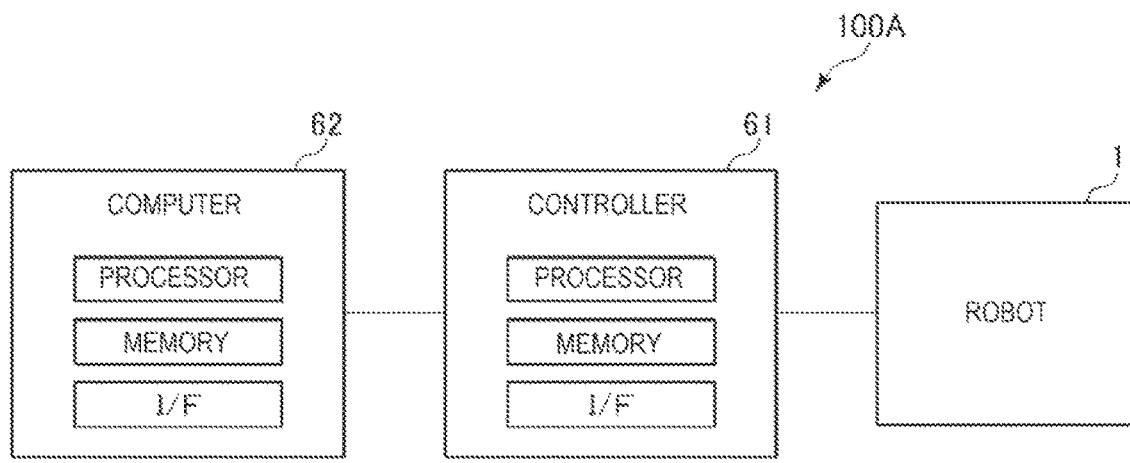
FIG. 12 is a block diagram for explaining a robotic system with a focus on hardware.

FIG. 12 is a block diagram for explaining a robotic system with a focus on hardware.

FIG. 12 shows an overall configuration of a robotic system 100A having the robot 1, a controller 61, and a computer 62 coupled to each other. The control of the robot 1 can be executed by reading out commands located in the memory with a processor located in the controller 61, or can be executed via the controller 61 by reading out the commands located in the memory with a processor located in the computer 62.

Therefore, it is possible to recognize either one or both of the controller 61 and the computer 62 as a "control device."

Modified Example 1

Figure 13:
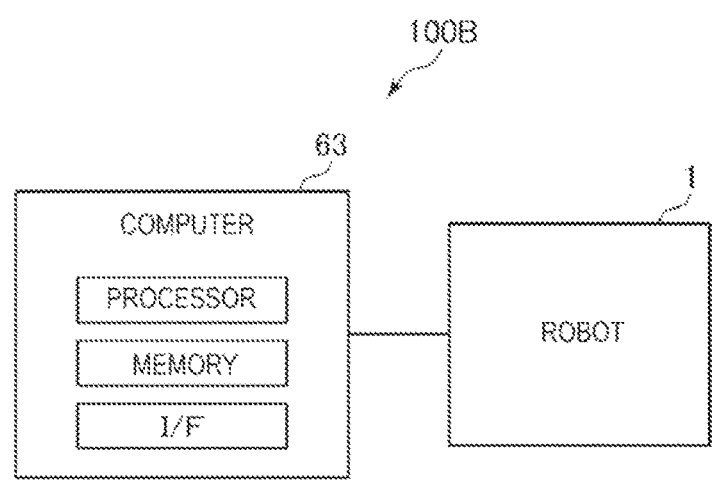
FIG. 13 is a block diagram showing Modified Example 1 with a focus on hardware of a robotic system.

FIG. 13 is a block diagram showing Modified Example 1 with a focus on hardware of a robotic system.

FIG. 13 shows an overall configuration of a robotic system 100B in which a computer 63 is directly coupled to the robot 1. The control of the robot 1 is directly executed by a processor located in the computer 63 reading out the commands located in the memory.

Therefore, it is possible to recognize the computer 63 as the "control device."

Modified Example 2

Figure 14:
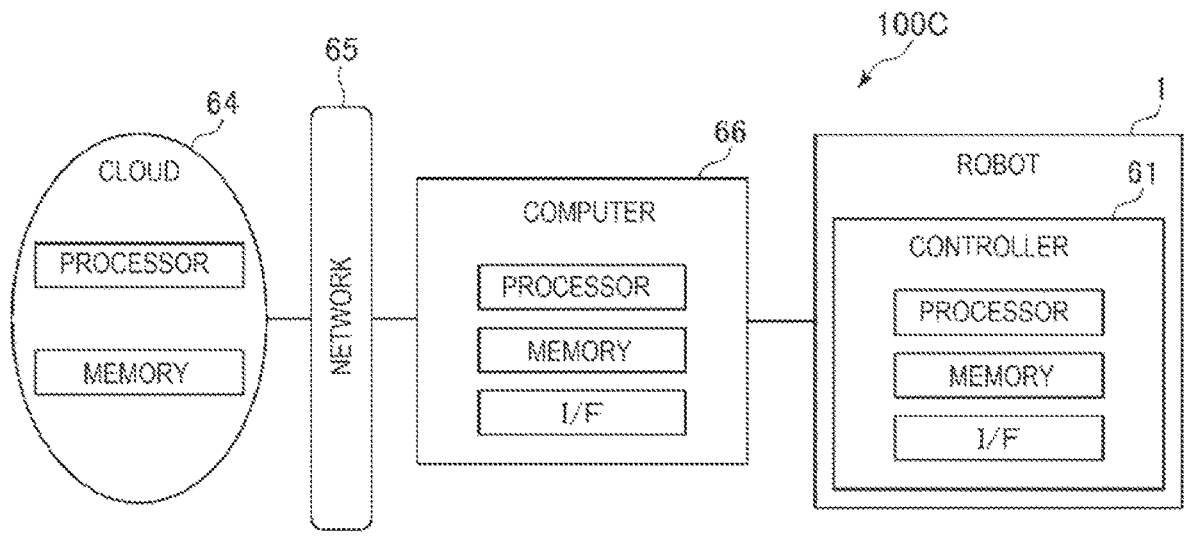
FIG. 14 is a block diagram showing Modified Example 2 with a focus on hardware of a robotic system.

FIG. 14 is a block diagram showing Modified Example 2 with a focus on hardware of a robotic system.

FIG. 14 shows an overall configuration of a robotic system 100C in which the robot 1 incorporating the controller 61 and a computer 66 are coupled to each other, and the computer 66 is connected to a cloud 64 via a network 65 such as LAN. The control of the robot 1 can be executed by reading out the commands located in the memory with a processor located in the computer 66, or can be executed by reading out the commands located in the memory via the computer 66 with a processor located on the cloud 64.

Therefore, it is possible to recognize any one, two, or three of the controller 61, the computer 66, and the cloud 64 as the "control device."

Although the method of adjusting the action parameter according to the present disclosure is described with reference to the illustrated embodiment, the present disclosure is not limited to the illustrated embodiment. Further, the constituents of the robotic system can be replaced with those capable of exerting substantially the same functions, and having arbitrary configurations. Further, it is possible to add arbitrary constituents.

What is claimed is:

1. A method of adjusting an action parameter for a robot, the method comprising:
    causing the robot to execute a task a plurality of times while changing a positional posture of an object when starting the task to obtain evaluation values of the respective tasks;
    comparing each of the evaluation values of the respective tasks with a reference evaluation value;
    determining an evaluation positional posture from the positional postures of the object, the evaluation positional posture having a first evaluation value of the evaluation values, the first evaluation value being equal to or lower than the reference evaluation value;
    causing the robot to operate with a tentative action parameter using the evaluation positional posture as a start-up positional posture in the task so as to:
        measure a vibration of the robot; and
        update the tentative action parameter based on the measured vibration of the robot;
    repeatedly performing the causing of the robot to operate with the tentative action parameter until the measured vibration of the robot is converged to determine a latest one of the tentative action parameters as a new action parameter; and
    setting the new action parameter to the robot so as to cause the robot to perform the task using the object.

2. The method of adjusting the action parameter according to claim 1, wherein
    the robot includes a robot arm having a plurality of joints, and
    a variation is provided to a rotational angle of each of the plurality of joints to obtain a plurality of the evaluation positional postures.

3. The method of adjusting the action parameter according to claim 1, wherein
    the task includes an operation of the robot using force control, and
    the action parameter includes a force control parameter.

4. The method of adjusting the action parameter according to claim 3, wherein
    the force control parameter includes at least one of a target force, a virtual viscosity coefficient, a virtual elastic coefficient, and a virtual mass coefficient.

* * * * *